United States Patent
Zhou et al.

(10) Patent No.: US 7,454,469 B2
(45) Date of Patent: Nov. 18, 2008

(54) METHOD AND SYSTEM FOR INSTANT MESSAGING BOTS SPECIFICATION USING STATE TRANSITION METHODOLOGY AND XML

(75) Inventors: Nianjun Zhou, Somers, NY (US); Chen Shu, Oakville, CT (US); Dikran S. Meliksetian, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 1071 days.

(21) Appl. No.: 10/744,425

(22) Filed: Dec. 22, 2003

(65) Prior Publication Data

US 2005/0138132 A1    Jun. 23, 2005

(51) Int. Cl.
G06F 15/16     (2006.01)
G06F 17/27     (2006.01)
(52) U.S. Cl. ............................ 709/206; 709/217; 704/9
(58) Field of Classification Search ......... 709/204–206, 709/217–219; 704/1–10
See application file for complete search history.

(56) References Cited

U.S. PATENT DOCUMENTS

| | | | |
|---|---|---|---|
| 5,442,786 A * | 8/1995 | Bowen ........................ | 707/102 |
| 5,682,539 A * | 10/1997 | Conrad et al. .................. | 704/9 |
| 6,338,044 B1 | 1/2002 | Cook et al. | |
| 6,430,602 B1 * | 8/2002 | Kay et al. .................... | 709/206 |
| 6,604,090 B1 * | 8/2003 | Tackett et al. ................. | 706/11 |
| 6,615,111 B2 * | 9/2003 | Tackett et al. ............... | 700/246 |
| 6,950,875 B1 * | 9/2005 | Slaughter et al. ............ | 709/230 |
| 6,993,555 B2 * | 1/2006 | Kay et al. .................... | 709/202 |
| 7,062,507 B2 * | 6/2006 | Wang et al. .................. | 707/102 |
| 7,139,798 B2 * | 11/2006 | Zircher et al. ............... | 709/204 |
| 7,249,117 B2 * | 7/2007 | Estes .......................... | 706/52 |
| 2001/0033298 A1 | 10/2001 | Slotznick | |
| 2002/0032590 A1 * | 3/2002 | Anand et al. ................... | 705/7 |

(Continued)

FOREIGN PATENT DOCUMENTS

WO    WO02/077816    10/2002

(Continued)

OTHER PUBLICATIONS

IBM Research Disclosure, "Linking Instant Messaging to Publish/Subscribe Messaging," #438166, Oct. 2000.

(Continued)

Primary Examiner—Joseph E Avellino
(74) Attorney, Agent, or Firm—John E. Campbell; Jeffrey Giunta; Fleit Gibbons Gutman Bongini & Bianco P.L.

(57) ABSTRACT

A framework for creating instant messaging Bots that autonomously operate within an instant messaging sessions to respond to requests from other user(s) or Bot(s). Bot operation is defined by a state machine with one or more states that are described in XML documents. These XML documents abide by the grammar of a Bot Transition Definition Language (BTDL) that is defined in an XML schema. A Bot developer creates a state transition diagram via a Graphical User Interface. The state transition diagram defines states, transitions between states, and conditions for each of those state transitions and methods to be performed upon each state transition. An XML document that conforms to BTDL format is created from the state transition definition diagram. Both stateful and stateless Bots are defined using XML documents abiding to a BTDL format. A runtime environment implements the Bots, accepts runtime inputs and generates responses.

26 Claims, 11 Drawing Sheets

U.S. PATENT DOCUMENTS

| | | | |
|---|---|---|---|
| 2002/0032735 A1 | 3/2002 | Burnstein et al. | |
| 2002/0111965 A1* | 8/2002 | Kutter | 707/513 |
| 2003/0009530 A1 | 1/2003 | Philonenko et al. | |
| 2003/0014439 A1* | 1/2003 | Boughannam | 707/513 |
| 2003/0093480 A1* | 5/2003 | Lagarde et al. | 709/206 |
| 2003/0110285 A1* | 6/2003 | Banerjee et al. | 709/236 |
| 2004/0073870 A1* | 4/2004 | Fuh et al. | 715/513 |
| 2004/0153211 A1* | 8/2004 | Kamoto et al. | 700/245 |
| 2004/0205772 A1* | 10/2004 | Uszok et al. | 719/317 |

OTHER PUBLICATIONS

Begole, James; Tang, John C.; Smith, Randall B.; Yankelovich, Nicole, "Work Rhythms: Analyzing Visualizations of Awareness Histories of Distributed Groups," Sun Microsystems Laboratories, 1-58113-560-2/02/0011, 2002.

Yu, Bin; Singh, Munindar P., "An Agent-Based Approach to Knowledge Management," ACM 1-58113-492-4/02/0011, 2002.

* cited by examiner

```
<?xml version="1.0" encoding="UTF-8"?>
<xsd:schema xmlns:xsd="http://www.w3.org/2001/XMLSchema">
  <xsd:annotation>
     <xsd:documentation xml:lang="en">Schema for Bot Transition Machine</xsd:documentation>
  </xsd:annotation>
  <xsd:element name="statemachine">          ── 502                    500
     <xsd:complexType>
        <xsd:sequence>
504 ──    <xsd:element maxOccurs="1" minOccurs="1" ref="state" />
        </xsd:sequence>
506 ── <xsd:attribute name="casesensitive" use="required">
           <xsd:simpleType>
              <xsd:restriction base="xsd:string">
                 <xsd:pattern value="[YN]" />
              </xsd:restriction>
           </xsd:simpleType>
        </xsd:attribute>
530 ── <xsd:attribute name="stateful" type="xsd:string" fixed="N" />
532 ── <xsd:attribute name="handlerclass" type="xsd:string" use="required" />
     </xsd:complexType>
  </xsd:element>
  <xsd:element name="state">  ── 508
     <xsd:complexType>
        <xsd:sequence>
510 ──    <xsd:element maxOccurs="unbounded" minOccurs="1" ref="transfer" />
        </xsd:sequence>
520 ── <xsd:attribute name="helpmsg" type="xsd:string" use="optional" />
        <xsd:attribute name="id" type="xsd:string" fixed="0" />
     </xsd:complexType>
  </xsd:element>
  <xsd:element name="transfer">── 512
     <xsd:complexType>
514 ── <xsd:attribute name="match" type="xsd:string" use="optional" />
516 ── <xsd:attribute name="method" type="xsd:string" use="optional" />
518 ── <xsd:attribute name="arguments" use="optional">
           <xsd:simpleType>
              <xsd:restriction base="xsd:string">
                 <xsd:pattern value="'.+'(','.+')*" />
              </xsd:restriction>
           </xsd:simpleType>
        </xsd:attribute>
     </xsd:complexType>
  </xsd:element>
</xsd:schema>
```

FIG. 6

```xml
<?xml version="1.0" encoding="UTF-8"?>
<xsd:schema xmlns:xsd="http://www.w3.org/2001/XMLSchema">
    <xsd:annotation>                                                    600
        <xsd:documentation xml:lang="en">Schema for Bot Transition Machine</xsd:documentation>
    </xsd:annotation>
    <xsd:element name="statemachine">    ─── 602
        <xsd:complexType>
            <xsd:sequence>
604 ───         <xsd:element maxOccurs="unbounded" minOccurs="1" ref="state" />
            </xsd:sequence>
            <xsd:attribute name="casesensitive" use="required">
                <xsd:simpleType>
                    <xsd:restriction base="xsd:string">
                        <xsd:pattern value="[YN]" />
                    </xsd:restriction>
                </xsd:simpleType>
            </xsd:attribute>
630 ───     <xsd:attribute name="stateful" type="xsd:string" fixed="Y" />
632 ───     <xsd:attribute name="handlerclass" type="xsd:string" use="required" />
634 ───     <xsd:attribute name="botstateclass" type="xsd:string" use="required" />
        </xsd:complexType>
    </xsd:element>
    <xsd:element name="state">  ─── 608
        <xsd:complexType>
            <xsd:sequence>
610 ───         <xsd:element maxOccurs="unbounded" minOccurs="1" ref="transfer" />
            </xsd:sequence>
620 ───     <xsd:attribute name="helpmsg" type="xsd:string" use="optional" />
            <xsd:attribute name="id" type="xsd:string" use="required" />
        </xsd:complexType>
    </xsd:element>
    <xsd:element name=transfer">  ─── 612
        <xsd:complexType>
614 ───     <xsd:attribute name="match" type="xsd:string" use="optional" />
626 ───     <xsd:attribute name="timeout" type="xsd:integer" use="optional" />
624 ───     <xsd:attribute name="event" type="xsd:string" use="optional" />
622 ───     <xsd:attribute name="state" type="xsd:string" use="optional" />
616 ───     <xsd:attribute name="method" type="xsd:string" use="optional" />
618 ───     <xsd:attribute name="arguments" use="optional" />
                <xsd:simpleType>
                    <xsd:restriction base="xsd:string">
                        <xsd:pattern value="'.+'(','.+')*" />
                    </xsd:restriction>
                </xsd:simpleType>
            </xsd:attribute>
        </xsd:complexType>
    </xsd:element>
</xsd:schema>
```

FIG. 7

```xml
<?xml verson="1.0"?>
<!--0 start
        1 person                                          800
        2 list
        3 person + list
        4 not found.  Ask further question
-->
<statemachine casesensitive="N" stateful="Y"
  handlerclass="com.ibm.adtch.easysearch.bot.EasySearchBotHandler"
  botstateclass="com.ibm.adtch.easysearch.bot.EasySearchBotState">
  <state id="0"
        helpmsg="state 0. Format should be who is name\email\tieline. Eg. Who is
1234567, who is John Smith, who is john@us.ibm.com ">
        <transfer match="who[\s]*is[\s]+[a-z\*]+" method="processLastName"
                arguments="'.','who[\s]*is[\s]+'" />
        <transfer match="who[\s]*is[\s]+[a-z]+[\s]*,[\s]*[[a-z]+[\s]*]+"
                method="processLastFirstName"
                arguments="'.','who[\s]*is[\s]+'" />
        <transfer match="who[\s]*is[\s]+[a-z]+[\s]+[[a-z]+[\s]*]+"
                method="processFirstLastName"
                arguments="'.','who[\s]*is[\s]+'" />
        <transfer match="who[\s]*is[\s]+.*[0-9]+.*" method="processTieline"
                arguments="'.','who[\s]*is[\s]+'" />
        <transfer match="who[\s]*is[\s]+.+@.*" method="processEmail"
                arguments="'.','who[\s]*is[\s]+'" />
        <transfer match="[\s]*help[\s]*" method="processHelp" />
  </state>
  <state id="1" helpmsg="state 1. Format should be name\country.">
        <transfer match="who[\s]*is[\s]+[a-z\*]+" method="processLastName"
                arguments="'.','who[\s]*is[\s]+'" />
        <transfer match="who[\s]*is[\s]+[a-z]+[\s]*,[\s]*[[a-z]+[\s]*]+"
                method="processLastFirstName"
                arguments="'.','who[\s]*is[\s]+'" />
        <transfer match="who[\s]*is[\s]+[a-z]+[\s]+[[a-z]+[\s]*]+"
                method="processFirstLastName"
                arguments="'.','who[\s]*is[\s]+'" />
        <transfer match="who[\s]*is[\s]+.*[0-9]+.*" method="processTieline"
                arguments="'.','who[\s]*is[\s]+'" />
        <transfer match="who[\s]*is[\s]+.+@.*" method="processEmail"
                arguments="'.','who[\s]*is[\s]+'" />
        <transfer match="(real\common\callup\first\sur\given)?[\s]*name"
                method="processSingleEntry"
                arguments="'callupname'" />
```

FIG. 9

```
<transfer match="country\land\nation" method="processSingleEntry"
        arguments="'co'" />
<transfer match="((lotus[\s]+)?notes[\s]+)?id"
        method="processSingleEntry"
        arguments="'notesemail'" />
<transfer match="(tele)?phone/external[\s]*(number\phone)"
        method="processSingleEntry"
        arguments="'telephonenumber'" />
<transfer match="tie[\s]*line\internal[\s]+phone"
        method="processSingleEntry"
        arguments="'tieline'" />
<transfer match="manager" method="processManager"/>
<transfer match="manages" method="processManages"/>
<transfer match="reports[\s]+to" method="processReportsTo"/>
<transfer match="[\s]*help[\s]*" method="processHelp" />
</state>
<state id="2" helpmsg="state 2. Format should be digit">
    <transfer match="who[\s]*is[\s]+[a-z\*]+" method="processLastName"
            arguments="'.','who[\s]*is[\s]+'" />
    <transfer match="who[\s]*is[\s]+[a-z]+[\s]*,[\s]*[[a-z]+[\s]*]+"
            method="processLastFirstName"
            arguments="'.','who[\s]*is[\s]+'" />
    <transfer match="who[\s]*is[\s]+[a-z]+[\s]+[[a-z]+[\s]*]+"
            method="processFirstLastName"
            arguments="'.','who[\s]*is[\s]+'" />
    <transfer match="who[\s]*is[\s]+.*[0-9]+.*" method="processTieline"
            arguments="'.','who[\s]*is[\s]+'" />
    <transfer match="who[\s]*is[\s]+.+@.*" method="processEmail"
            arguments="'.','who[\s]*is[\s]+'" />
    <transfer match="[1-9][0-9]*" method="processMultipleEntry"
            arguments="'.'" />
    <transfer match="[\s]*help[\s]*" method="processHelp" />
</state>
<state id="3" helpmsg="state 3. Format should be who is or sth like 1 smith">
    <transfer match=" who[\s]*is[\s]+[a-z\*]+" method="processLastName"
            arguments="'.','who[\s]*is[\s]+'" />
    <transfer match="who[\s]*is[\s]+[a-z]+[\s]*,[\s]*[[a-z]+[\s]*]+"
            method="processLastFirstName"
            arguments="'.','who[\s]*is[\s]+'" />
    <transfer match="who[\s]*is[\s]+[a-z]+[\s]+[[a-z]+[\s]*]+"
            method="processFirstLastName"
            arguments="'.','who[\s]*is[\s]+'" />
    <transfer match="who[\s]*is[
```

FIG. 10

```
}s]+.*[0-9]+.*" method="processTieline
           arguments="'.','who[\s]*is[\s]+'" />
<transfer match="who[\s]*is[\s]+.+@.*" method="processEmail"
           arguments="'.','who[\s]*is[\s]+'" />
<transfer match="[1-9][0-9]*" method="processMultipleEntry"
           arguments="'.'" />
<transfer match="(real\common\callup\first\sur\given)?[\s]*name"
           method="processSingleEntry"
           arguments="'callupname'" />
<transfer match="country\land\nation" method="processSingleEntry"
           arguments="'co'" />
<transfer match="email[\s]*(address)?"
           method="processSingleEntry"
           arguments="'emailaddress'" />
<transfer match="(us[\s]+)state"
           method="processSingleEntry"
           arguments="'state'" />
<transfer match="zip[\s]*code"
           method="processSingleEntry"
           arguments="'postal'" />

<transfer match="((lotus[\s]+)?notes[\s]+)?id"
           method="processSingleEntry"
           arguments="'notesemail'" />
<transfer match="(tele)?phone\extrnal[\s]*(number\phone)"
           method="processSingleEntry"
           arguments="'telephonenumber'" />
<transfer match="tie[\s\*line\internal[\s]+phone"
           method="processSingleEntry"
           arguments="'tieline'" />
<transfer match="city\town\locality"
           method="processSingleEntry"
           arguments="'city'" />
<transfer match="address"
           method="processSingleEntry"
           arguments="'address'" />

<transfer match="manager" method="processManager"/>
<transfer match="manages" method="processManages"/>
<transfer match="report[\s]+to" method="processReportsTo"/>
<transfer match="[\s]*help[\s]*" method="processHelp" />
```

FIG. 11

```
</state>
<state id="4" helpmsg="state 4. Format should be who is or sth like 1 smith">
    <transfer match="who[\s]*is[
}s]+[a-z\*]+" method="processLastName"
            arguments="'.','who[\s]*is[\s]+'" />
    <transfer match="who[\s\*is[
}s]+[a-z]+[\s]*,[\s]*[[a-z]+[\s]*]+"
            method="processLastFirstName"
            arguments="'.','who[\s]*is[\s]+'" />
    <transfer match="who[\s]*is[\s]+[a-z]+[\s]+[[a-z]+[\s]*]+"
            method="processFirstLastName"
            arguments="'.','who[\s]*is[\s]+'" />
    <transfer match="who[\s]*is[\s]+.*[0-9]+.*" method="processTieline"
            arguments="'.','who[\s]*is[\s]+'" />
    <transfer match="who[\s]*is[\s]+.+@.*" method="processEmail"
            arguments="'.','who[\s]*is[\s]+'" />
    <transfer match="[1-9][\s]+.+" method="processQuestion"
            arguments="'.'" />
    <transfer match="[\s]*help[\s]*" method="processHelp" />
</state>
</statemachine>
```

FIG. 12

METHOD AND SYSTEM FOR INSTANT MESSAGING BOTS SPECIFICATION USING STATE TRANSITION METHODOLOGY AND XML

BACKGROUND OF THE INVENTION

1. Field of the Invention

This invention relates to creating automated data exchange services, and more specifically to the design, development and creation of automated data exchange services, and in particular to automated data exchange services relating to instant messaging services.

2. Description of Related Art

"Instant Messaging" services are one form of electronic communications that allow communications among individuals. Instant messaging services include one-to-one, one-to-many, and many-to-many communications services and also so-called "Chat Rooms." Examples of instant messaging services are services that allow one or more individuals to start a communications session with one or more other individuals. In order to start and/or maintain these communication sessions, an individual creates an instant messaging forum and invites other individuals to "join" that forum or "chat room." Once this communications session is started, all of the individuals in that communications session are able to type text messages that are then instantly received by all of the other participating individuals. The other individuals receiving the text messages are then able to type responses or new messages. These responses or new messages are then received by all of the participating individuals. Instant messaging allows for a flexible and easily re-configurable communications sessions between multiple individuals, including Bots.

Another form of data communications and retrieval involves an individual's use of automated data retrieval and data supplying systems. Such systems are used by accessing a number of one-to-one data servers, such as World Wide Web (WWW) servers and File Transfer Protocol (FTP) servers. A user can use the World Wide Web to access automated processes, sometimes referred to as "Bots," that operate to respond to questions that are presented in a specific format. Such Bots require an individual to set up a dedicated, one-to-one interaction with each Bot from which information is to be requested. Setting up and keeping track of these one-to-one interactions can be a tedious and inconvenient process for the individual user.

A further development is to incorporate these Bots into instant messaging services. Such configurations simplify the interaction of the individual user with the Bot, since the Bot appears to the user as another participant in the instant messaging service.

Traditionally, Bot developers have to write programs to deal with the wide possible variety of user runtime input sequences. Bot programs typically have to check the validity of runtime inputs, verify that the runtime input sequence thus far is correct and perform the required tasks accordingly. This results in complex code, longer development cycles and less software reusability.

A need therefore exists for an easily designed, developed, deployed and maintained automated data retrieval and communications processes that allow individuals to conveniently access, use, and share those processes.

SUMMARY OF THE INVENTION

Briefly, in accordance with a preferred embodiment of the present invention, a method for defining an instant messaging Bot process includes accepting an XML schema that defines elements for instant messaging Bots. The elements for use in XML documents that define instant messaging Bots that accept at least one runtime input and provide at least one response in response to the at least one runtime input. The elements defined in the XML schema comprise definitions for elements that correspond to at least one state definition, at least one state transition definition, and at least one condition definition for each of the at least one state transition. The method further includes creating a state transition definition diagram for an instant messaging Bot, the state transition definition diagram comprising at least one state, at least one state transition, and at least one condition for each of the at least one state transition. The method further includes generating an XML document that corresponds to the state transition definition diagram and that abides to the XML schema.

In another aspect of the present invention, an instant messaging Bot development system includes an XML schema repository for storing at least one XML schema. Each of the at least one XML schema defining elements for instant messaging Bots that accept at least one runtime input and provide at least one response in response to the at least one runtime input. The elements defined in the XML schema comprise definitions for elements that correspond to at least one state definition, at least one state transition definition, and at least one condition definition for each of the at least one state transition definition. The instant messaging Bot development system further includes a state transition diagram definition tool for creating a state transition diagram for an instant messaging Bot. The state transition definition has at least one state, at least one state transition, and at least one condition for each of the at least one state transition. The instant messaging Bot development system also includes an XML document generator for generating an XML document that corresponds to the state transition diagram and that conforms to the XML schema.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter that is regarded as the invention is particularly pointed out and distinctly claimed in the claims at the conclusion of the specification. The foregoing and other features and also the advantages of the invention will be apparent from the following detailed description taken in conjunction with the accompanying drawings.

FIG. 6 illustrates an exemplary stateless Bot XML schema, as used by an exemplary embodiment of the present invention.

FIG. 7 illustrates an exemplary stateful Bot XML schema, as used by an exemplary embodiment of the present invention.

FIGS. 9-12 illustrate portions of an exemplary XML document defining an instant messaging Bot process, as generated by an exemplary embodiment of the present invention.

DESCRIPTION OF THE PREFERRED EMBODIMENTS

Exemplary System Overview

Figure 1:
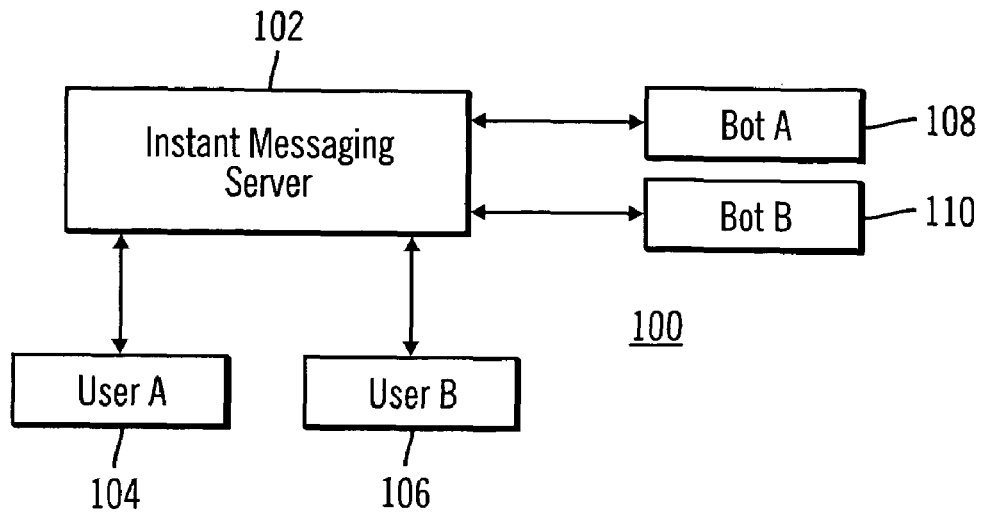
FIG. 1 illustrates an instant messaging system according to an exemplary embodiment of the present invention.

An instant messaging system 100, as used in an exemplary embodiment of the present invention, is illustrated in FIG. 1. The instant messaging system 100 includes an instant messaging server 102 that is a host for instant messaging communication sessions in this embodiment. The instant messaging communications server 102 provides a mechanism that allows one or more clients and/or instant messaging Bots to establish one or more instant messaging sessions. The instant messaging clients, such as exemplary User A 104, User B 106, Bot A 108, and Bot B 110, are able to establish instant messaging sessions between each other and/or among multiple clients. The number of exemplary clients shown herein is for illustration only and the exemplary embodiment of the present invention is able to operate with any number of users and/or Bots communicating through an instant messaging server 102. Relevant components of similar systems and methods are described in U.S. patent application Ser. No. 10/207,711, entitled "INTERACTIVE FILTERING ELECTRONIC MESSAGES RECEIVED FROM A PUBLICATION/SUBSCRIPTION SERVICE," filed with the U.S. Patent and Trademark Office on Jul. 26, 2002. The entire teachings and contents of U.S. patent application Ser. No. 10/207,711 are hereby explicitly incorporated herein by reference.

It is to be further understood that the instant messaging server 102 can be hosted by a single computer node or distributed over a number of computer nodes that are either collocated or geographically disperse, as is suited for the particular application incorporating the exemplary embodiment. Clients, such as User A 104 and Bot A 108, are also able to use software that is hosted by the same computing system node as the instant messaging server 102 or they are able to use software that is hosted on different computing system nodes that are in communications with the computing system node hosting the instant messaging server 102. Clients, such as User A 104 and Bot B 110, that use software executing on different computing system nodes are able to communicate with a computing system node hosting the instant messaging server 102 over a variety of channels and mechanisms. Such communications can be performed via the Internet, private networks, public networks, combinations of private and public networks, point-to-point electronic communications and other communications modes that include radio, infrared, terrestrial, satellite and/or other communications mechanisms.

In operation, users and Bots log on to the instant messaging server, thus making themselves available to participate in instant messaging sessions through different communications mechanisms, including other electronic data communications, voice communications over wired or wireless telephone, paging, or other means, facsimile or any other communications mechanism.

The instant messaging Bots of the exemplary embodiment appear to other users as regular instant messaging clients or users, however their function is to provide specific services for end users. These Bots can be used in a variety of applications—such as adaptive searches for finding people, e-business transactions such as purchase and reimbursement approval through the instant messaging service, intelligent FAQ systems, and any other applications that are enhanced by remembering the behavior of end-users.

Instant messaging sessions are initiated, for example, by a client's inviting another client to enter into an instant messaging communications session. Invitations to enter into an instant messaging session are communicated by a function of the instant messaging software supported by the instant messaging server 102 or an invitation can be communicated through different communications mechanisms, including other electronic data communications, voice communications over wired or wireless telephone, paging, or other means, facsimile or any other communications mechanism. Once invited, or upon their own initiative, other users join the instant messaging session by establishing a physical communication session to the instant messaging session through one of the many methods known to practitioners in the relevant arts.

User A 104 and User B 106 are exemplary human users that are communicating with each other in an instant messaging system configuration. In addition to these human users, the exemplary embodiment of the present invention includes exemplary instant messaging Bots indicated by Bot A 108 and Bot B 110, which are commonly referred to as RoBots or just "Bots." The exemplary instant messaging Bots of the exemplary embodiment become participating members of instant messaging sessions just like any other client or user, including human clients such as User A 104 and User B 106. The Bots of the exemplary embodiment receive one or more runtime inputs, which are messages entered by other clients of an instant messaging session in the exemplary embodiment, and the Bot then automatically responds to those received runtime inputs that correspond to questions, answers, or messages to which the Bot has been configured to respond. Responses by the Bots in the exemplary embodiment are able to include text messages that are entered into the instant messaging session from which the runtime input had been received. Bots of the exemplary embodiment can be invited into one or more instant messaging communication sessions, and/or the instant messaging server 102 is able to configure some Bots to be automatically included for participation in some or all instant messaging sessions hosted by that instant messaging server 102. Individual clients, such as User A 104, can further customize their operating environment to automatically include one or more Bots in some or all instant messaging sessions that are initiated or entered by that individual client.

Figure 2:
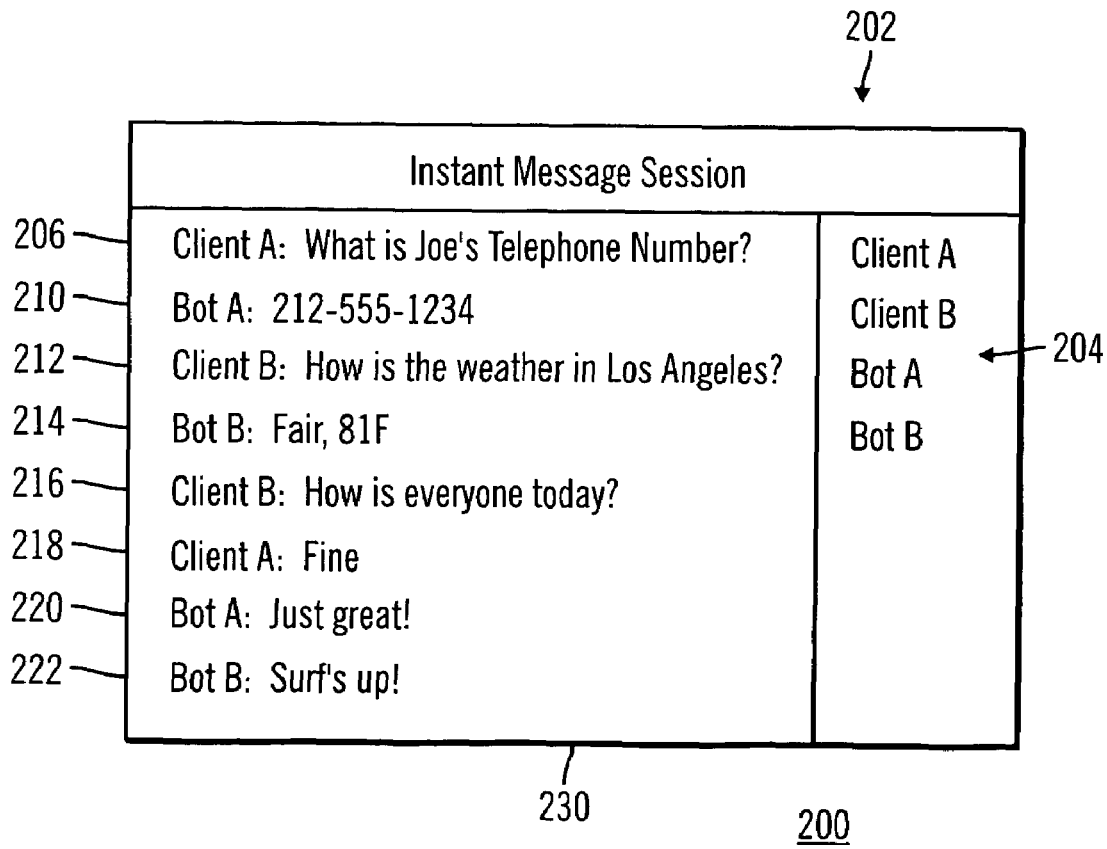
FIG. 2 illustrates an exemplary instant messaging session display as generated during use of an exemplary instant messaging system, according to an exemplary embodiment of the present invention.

An exemplary instant messaging session display 200 is illustrated in FIG. 2. The exemplary instant messaging session display 200 is a user display that is presented at a workstation, such as a screen on a personal computer, a personal digital device or a cellular phone, to allow a user to participate in an instant messaging session. The exemplary instant messaging session display 200 includes an instant messaging session window 202 that is divided into several sections. The instant messaging session window 202 includes a participant window section 204 that displays a list of the participants for this instant messaging session. The participant window section 204 has one entry for each of the clients illustrated for the exemplary instant messaging system 100. This indicates that all of the clients illustrated in the exemplary instant messaging system 100 are participating in this instant messaging session. It is to be noted that not all clients using the instant messaging server 102 are required to be participating in this particular instant messaging session. The instant messaging server 102 is able to host several instant messaging sessions that each include only some or even all of the clients using the instant messaging server 102 of the exemplary embodiment. The clients listed in the participant window section 204 in this embodiment are only those clients who are participating in this instant messaging session. Clients in the exemplary embodiment are able to participate in an instant messaging session only after explicitly joining that instant messaging session. Clients generally join instant messaging sessions after either creating the session, being invited to join the session, or by knowledge of the session that was obtained by various means. Knowledge of an instant messaging session is able to be obtained by, for example, viewing a listing of instant messaging sessions available by accessing a special function of the instant messaging server.

The instant messaging session window 202 of the exemplary embodiment also includes a message window 230. The message window 230 of the exemplary embodiment displays message lines that contain messages that are entered by clients who are participating in this particular instant messaging session. Each message line displayed in the message window 230 includes a prefix that identifies the client, such as a user or Bot, that entered the message. This prefix is automatically entered by the instant messaging server 102 to facilitate operation of the instant messaging session. This prefix is followed by the text message entered by that client. This allows readers of the instant messaging session messages to determine who entered a particular message and assists in defining a context for each message.

A first message line 206 is illustrated to contain "User A: What is Joe's Telephone Number?" The first message 206 has a prefix of "User A:" and a message text of "What is Joe's Telephone Number?" This is a general question that is directed to all participants in this particular instant messaging session. The prefix for the first message indicates that User A 104 entered the associated message text. The prefix for these message lines is automatically entered by the instant messaging server 102 in this exemplary embodiment. The user in this exemplary embodiment only enters the message text and the instant messaging server 102 automatically prepends the prefix identifying that user. A second message line 208 is illustrated to contain "Bot A: 212-555-1234." This message was automatically entered by Bot A 108 in response to the first message 206. Bot A 108 in this example is an automatic telephone number lookup Bot and was designed and configured to respond to questions regarding telephone numbers. The response by Bot A 108 in this example is similar to a response that would be entered by a human user. The prefix for the second message 208 is "Bot A:" and was automatically prepended by the instant messaging server 102 of the exemplary embodiment. This prefix was selected in this description to more clearly illustrate the operation of the Bots in the present example. A friendlier or even human name could have easily been used to identify that Bot, thereby giving an appearance of having a human assistant participating in the instant messaging session.

A third message 210 is illustrated as "User B: How is the weather in Los Angeles?" This is a general question directed to all clients participating in this particular instant messaging session. Such a question could be entered, for example, by a user who thinks that someone from Los Angeles is participating in this instant messaging session. Bot B 110 in this example is an automated weather reporting service that is configured to respond to questions about weather. In this example, Bot B 110 responds with a fourth message line 214 which is "Bot B: Fair, 81 degrees F." as a response. Again, if a more friendly or human name were given to Bot B 110, it would appear to the users that a person was providing this answer and would provide a more natural exchange for the human participants in this instant messaging session. Each Bot of the exemplary embodiment only responds to messages with a pattern defined for that particular Bot. For example, a question to ask Bot B 110 for weather information will not result in a response by Bot A 108, even though Bot A 108 also received the message.

A fifth message line 216 is a question by User A 104 "User A: How is everyone?" User B 106 responds and a sixth message "User B: Fine" is displayed. User B 106 in this example only typed the message text "Fine" and the "User B:" text was automatically prepended by the instant messaging server 102. In order to provide a more natural appearance for the Bots in this exemplary embodiment, the Bots are configured to also answer this question. Bot A 108 responds with a seventh message line 220 that is "Bot A: Just Great!" and Bot B 110 responds with an eight message line 222 that is "Bot B: Surf's Up!" Bot B 110 in this example was configured to remember the weather last reported so as to enhance the appearance of context in this instant messaging session.

Figure 3:
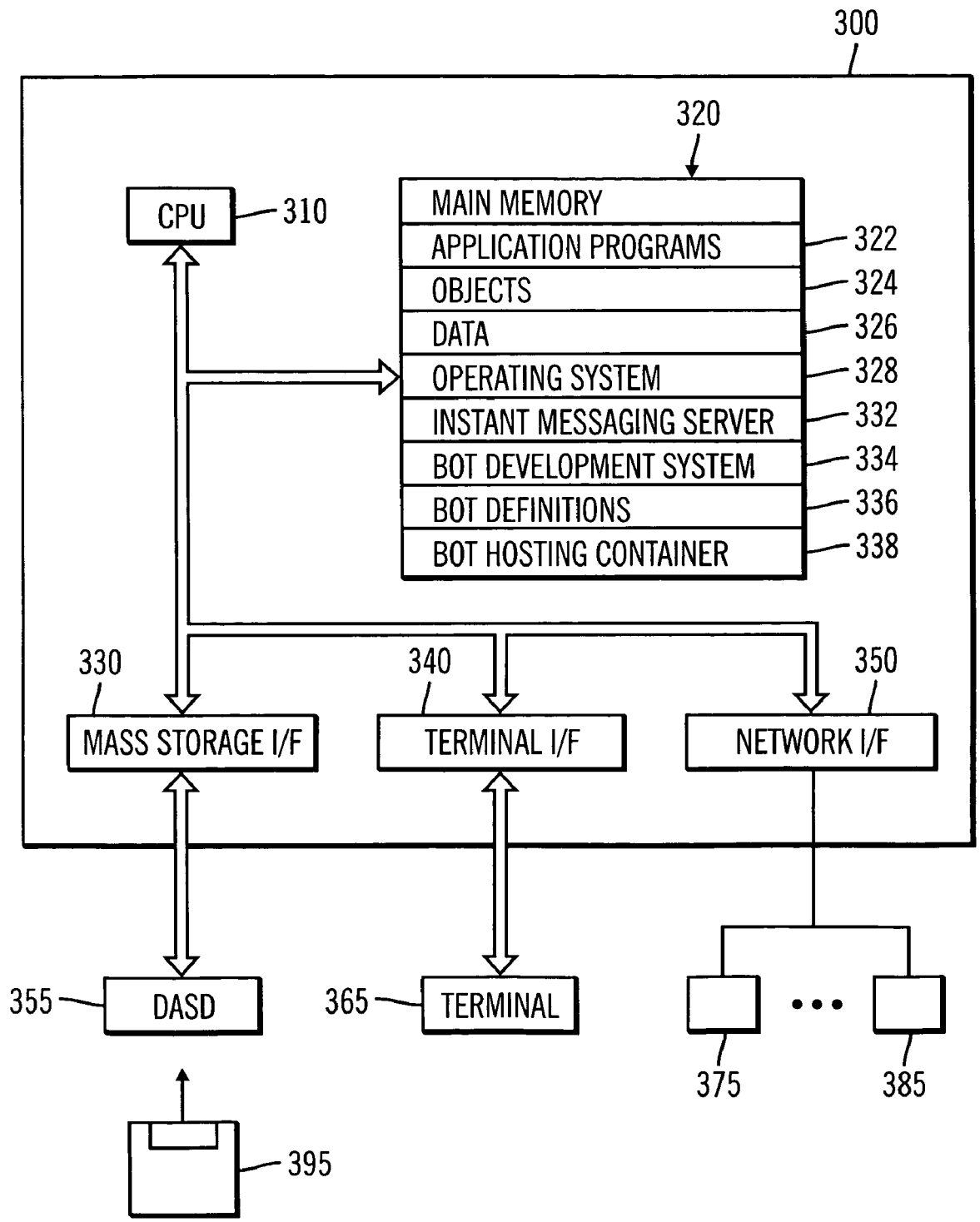
FIG. 3 illustrates a block diagram depicting a computing system 300, as used by an exemplary embodiment of the present invention.

A block diagram depicting a computer system 300, which is a processing circuit as used by an exemplary embodiment of the present invention, is illustrated in FIG. 3. Any suitably configured processing system can be used by embodiments of the present invention. Within the scope of the present invention, a processing circuit is a broad concept including a single circuit as well as large, geographically distributed computing systems. The computer system 300 of the exemplary embodiment has a processor 310 that is connected to a main memory 320, mass storage interface 330, terminal interface 340 and network interface 350. A system bus 360 interconnects these system components. Mass storage interface 330 is used to connect mass storage devices, such as DASD device 355, to the computer system 300. One specific type of DASD device is a floppy disk drive, which may be used to store data to and read data from a floppy diskette 395.

Main Memory 320 contains application programs 322, objects 324, data 326 and an operating system image 328. Although illustrated as concurrently resident in main memory 320, it is clear that the applications programs 322, objects 324, data 326, and operating system 328, are not required to be completely resident in the main memory 320 at all times or even at the same time. Computer system 300 utilizes conventional virtual addressing mechanisms to allow programs to behave as if they have access to a large, single storage entity, referred to herein as a computer system memory, instead of access to multiple, smaller storage entities such as main memory 320 and DASD device 355. Note that the term "computer system memory" is used herein to generically refer to the entire virtual memory of computer system 300.

Operating system 328 is a suitable multitasking operating system. Operating system 328 includes a DASD management user interface program to manage access through the mass storage interface 330. Some embodiments of the present invention utilize architectures, such as an object oriented framework mechanism, that allows instructions of the components of operating system 328 to be executed on one of multiple processors that may be within or outside of computer 300.

Although only one CPU 302 is illustrated for computer 302, computer systems with multiple CPUs can be used equally effectively. Embodiments of the present invention incorporate interfaces that each includes separate, fully programmed microprocessors that are used to off-load processing from the CPU 302.

Terminal interface 308 is used to directly connect one or more terminals 318 to computer system 300. These terminals 318, which are able to be non-intelligent or fully programmable workstations, are used to allow system administrators and users to communicate with computer system 300.

Network interface 350 is used to connect other computer systems or group members, e.g., Station A 375 and Station B 385, to computer system 300. The present invention works with any data communications connections including present day analog and/or digital techniques or via a future networking mechanism.

Although the exemplary embodiments of the present invention are described in the context of a fully functional computer system, those of ordinary skill in the art will appreciate that embodiments are capable of being distributed as a computer program product via floppy disk, e.g. floppy disk 395, CD ROM, or other form of recordable media, or via any type of electronic transmission mechanism.

The main memory 320 of the exemplary computing system node 300 contains an instant messaging server executable software 332. The instant messaging server executable software 332 implements an instant messaging server 102 as discussed herein. The main memory 320 of the exemplary computing system node 300 further includes a Bot development system executable software 334 that allows a developer to develop, specify and create the Bots used by the exemplary embodiments, as is described herein. The main memory of the exemplary computing system node 300 further includes Bot definitions 336 that are stored in an XML schema repository and a Bot hosting container 338 to support the Bot runtime environment as are described in detail below.

Although the exemplary embodiments of the present invention are described in the context of an instant messaging server, Bot development system, Bot definitions and Bot hosting container that are located on the same computing system 300, those of ordinary skills in the art will appreciate the ability to have embodiments that host the instant messaging server on one computing system 300, host the Bot development system on another computing system 300, and host the Bot hosting container and Bot definitions on a third computing system 300. Many such combinations of distributed component hosting are possible and within the scope of the present invention.

Other computing system nodes 300 of the exemplary embodiment include an instant messaging client software component (not shown) to allow users to participate in an instant messaging session. Instant messaging client software components are generally included in computers used by human users, such as User A 104 and User B 106.

Embodiments of the present invention include a Bot Development System that includes software to allow a Bot developer to develop Bots that participate in instant messaging sessions. The Bots of the exemplary embodiment are referred to as intelligent instant messaging agents. The Bots respond to the receipt of text messages by performing automatic processing, extendable functionality, and context-specific responses, such as providing help information.

Challenges in the development of Bots include complications that are based upon the inherent features of the complex business logic when creating a Bot. The Bots created in the exemplary embodiment of the present invention are generally characterized as state machines. These features of the Business Rules can be categorized as follows: 1) the state of the Bot and the allowed state transitions that cause the Bot to maintain the context of a given communication session with a specific end-user; and 2) the set of runtime inputs from an end-user that are acceptable for the current context of the communication session. The Bot development system described herein provides a procedure and framework that obviates many of the very time consuming tasks of Bot development. This procedure and framework obviates, for example, much of the coding and testing effort associated with the development of conventional Bots.

Two components are described as a part of the Bot development system of the exemplary embodiment of the present invention. A first component is a Bot Transition Definition Language (BTDL) based notation for XML documents. The XML schemas that define particular BTDLs are used to define the keywords of a particular BTDL as is suited for a particular application. XML documents abiding to BTDL, i.e., that use the keywords defined for the BTDL, are then generated to implement state machines to perform the processing for the Bot being defined. The generated XML document defines the state transition definitions and acceptable runtime inputs for each state for the Bot defined by the BTDL compliant XML document. Context-specific help messages can also be defined as part of the XML document. A second component of the exemplary embodiment of the present invention is a methodology and a framework to help implement a Bot.

The framework provided by the exemplary Bot development system allows an application developer to define the states of a Bot and the state transition definition diagram for transitions between the defined states. The transition from one state to another state in the exemplary embodiment is determined by three factors: 1) the current state; 2) the content of a runtime input message from an end-user for this session; and 3) the processing method invoked. Based on the nature of application being implemented by the Bot, the transition between the states can be transient or long-standing. A transient state-transfer is intended to be accomplished in a relatively short time and usually within the scope of one physical communication session. On the other hand, a long-standing Bot allows some of the state-transfers, i.e., some edges of the directed graph, to last beyond a physical communication session. Physical communications sessions in the exemplary embodiment include constructs such as a TCP session.

The Bot development system of the exemplary embodiment supports definition of stateless Bots. A stateless Bot can be viewed as a special case of a stateful Bot, where the stateless Bot only has one state and does not need to maintain state information across received and processed messages. One example of a simple stateless Bot is a stock quote service Bot. In this example, the Bot does not need to remember the previous stock symbol lookup.

The Bot development system of the exemplary embodiment includes a graphical user interface (GUI) that allows a Bot developer to easily define a state transition definition diagram, which is a directed graph, for a Bot being developed. The state transition definition diagram of the exemplary embodiment is a graphical representation of a state transition diagram for an instant messaging Bot state machine or Bot. The GUI further allows the developer to enter a text format, such as a legitimate format, for at least one runtime input that is to be accepted by the Bot. Additionally, the GUI is able to display a list of acceptable exemplary legitimate format specifications for a runtime input in order to assist the Bot developer in defining the Bot transition state diagram.

A communication session for a Bot is identified by the set of the participating users that are communicating with the Bot in an instant messaging session. Each user has a unique user ID. Based on the number of the participating users, the session is categorized as either a one-to-one session, a one-to-many session, or a many-to-many session.

Communication operations performed by a Bot include communications between the Bot and either one user or Bot, or among multiple users or Bots. A characteristic of communications with multiple participating instant messaging clients, either human users or other Bots, is referred to as a communication mode. A communication mode is defined as a sub-graph of the state transition graph for a Bot. Only part of the nodes, i.e., states, and edges of the state transition diagram for the Bot, are included in these sub-graphs. Based upon the current communications mode, processing can be restricted to only a portion of the entire state machine transition definition for the Bot, as is described below. Therefore, the state transfer and message processing for the Bot in this example is limited to the operations specified by the sub-graph associated with the current communications mode. Triggers for a Bot to enter or leave a specific communication mode can be defined in the XML document as a state transition based upon specific keywords.

Communication modes are defined to aid a Bot in determining if a message is to be processed by that Bot. A human participant in an instant messaging session is able to judge whether to respond to a message received in an instant messaging session with multiple clients. Automating this judgment typically requires defining a significant amount of processing for the Bot. If this judgment is not fully implemented, some Bots could become 'out-spoken' Bots that respond with too many messages. External controls are usually needed in conventional systems to overcome such difficulties.

Two exemplary communication modes are defined within the exemplary embodiment of the present invention, a help-enabled mode and a help-disabled mode. In the help enabled mode, the processing of all requests involves the processing of the whole state transition graph defined for that Bot. The explicit edges define the transitions between states when a transition condition is matched. The implicit edges define the transition loop-back to the same node with content-based help response messages when none of the transition conditions defined for explicit transitions for that state is matched. In the help enabled exemplary communications mode, the entire state machine definition is processed.

In the help-disabled communication mode, the implicit edges of the state transition diagram are not processed. In this exemplary state machine definition that includes a help disabled communications mode, the implicit edges define the help messages. In the exemplary help-disabled communications mode, only a portion of the state machine definition, i.e., those portions not defining the help message transitions, is processed.

In the case of a stateless Bot, the state machine, as defined by a state transition diagram, has only one state and state information is not maintained. The behavior of a stateless Bot is determined by the current communication mode and the runtime inputs of the communication session. The state transition graph for a stateless Bot is still used to describe the behavior of a stateless Bot. A stateless Bot has one node that represents the one and only state for that Bot. The one node of a Stateless Bot has a set of node edges that originated from the one node. Each node edge has a regular expression that defines an acceptable runtime input pattern and a processing method to be performed upon satisfaction of that expression, e.g., the receipt of a specified runtime input. The processing methods for the node edges are defined by an object class name, a method name of that object class and a set of runtime input parameters for the method. The parameter values for the methods in the exemplary embodiment are a list of strings that are uniquely determined from the runtime input. Each node of a stateless node in the exemplary embodiment further has a default message that is to be sent out in help-enabled mode when none of the conditions for the specified edges is matched.

In contrast to a stateless Bot, a stateful Bot has multiple possible states and information for the current state is maintained for the Bot. The behavior of a stateful Bot is determined by the communication mode, current state and a next runtime input from the communication session. A trigger event further defines the behavior of a proactive, stateful Bot. A state transition diagram, such as a directed graph, is an example of a definition of state transition behavior or of a state transition diagram. The directed graph for a stateful Bot has a set of nodes with each node representing a state. The set of edges defined by the directed graph defines how the state machine for the stateful Bot is to transition from one state to another. Each state edge has: 1) a regular expression that defines an acceptable runtime input pattern; and 2) a processing method or the next state to which to transition. The processing methods for the state diagram are defined by an object class name, a method name of the object class and a set of runtime input parameters to be provided to the method. For each state in a stateful Bot, the regular expressions of outbound edges define the acceptable data formats for runtime inputs to the state. If a runtime input is not accepted by a state, the state remains unchanged.

Additionally, if a default message is defined for the state, the default message will be sent out as help message if the runtime input is not accepted by the state. Otherwise, the state machine of the Bot does not send any messages. This causes the Bot to appear to other clients of the instant messaging session as silent in response to this runtime input.

One example of a stateful Bot is an adaptive search system. The user starts a search by providing the Bot a parameter value as a runtime input, such as a last name, a first name or a phone number. This parameter value corresponds to a message entered by the user in an instant messaging session. After receiving these parameters, the Bot of this example performs a search based upon the received runtime input parameter. Based on the search results returned from the search system, the Bot transits to different states of the state transition diagram defined for that Bot. This causes the Bot to demonstrate different behaviors based upon the returned search results. For example, if the search returns too many results to display on one screen, the Bot is configured to continue to ask for additional information from the user. If the results are satisfactory, the Bot returns the result to the user via a responding message entered into the instant messaging system.

Figure 4:
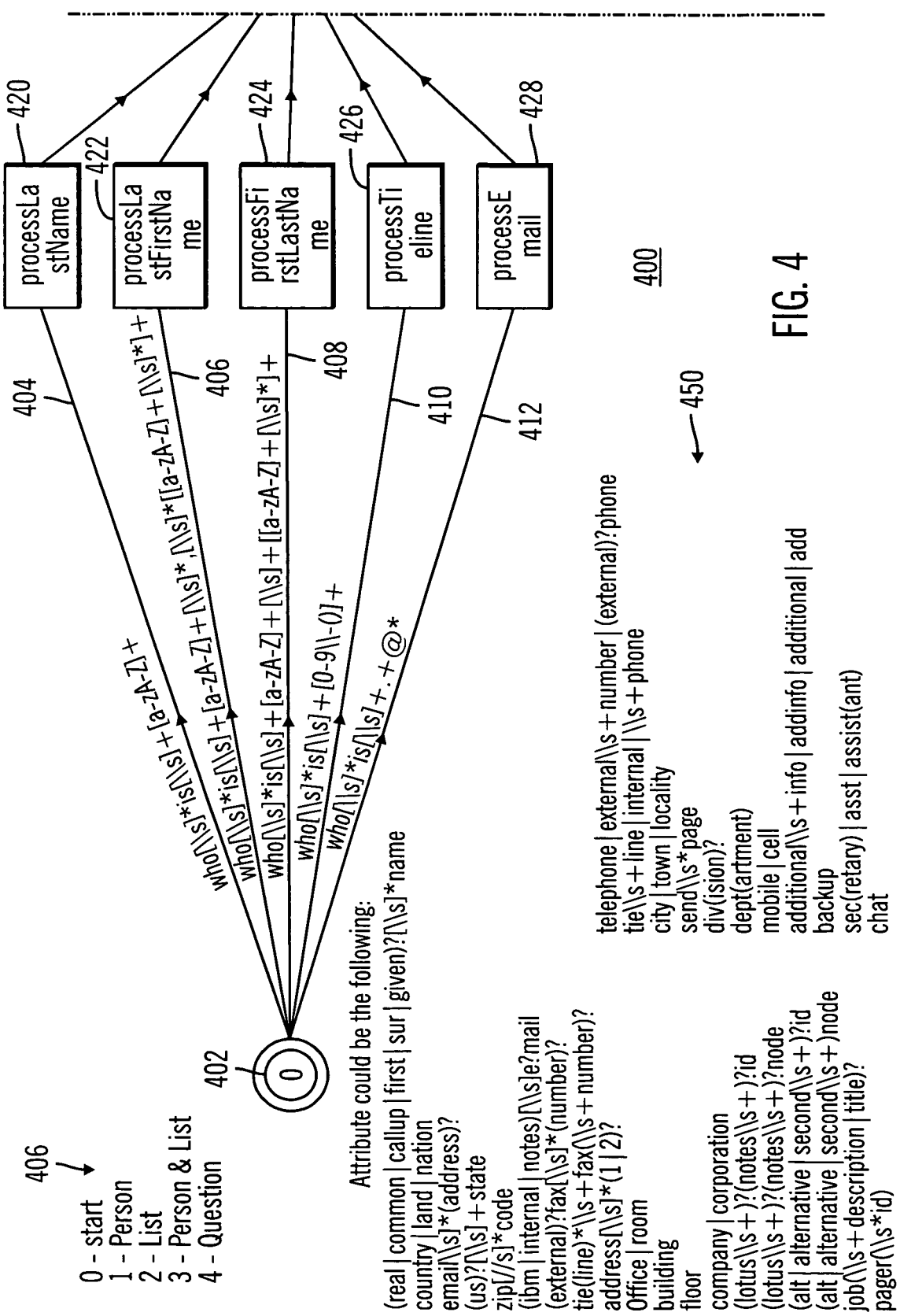
FIGS. 4 and 5 illustrates an exemplary Bot state transition definition diagram, in accordance with an exemplary embodiment of the present invention.
Figure 5:
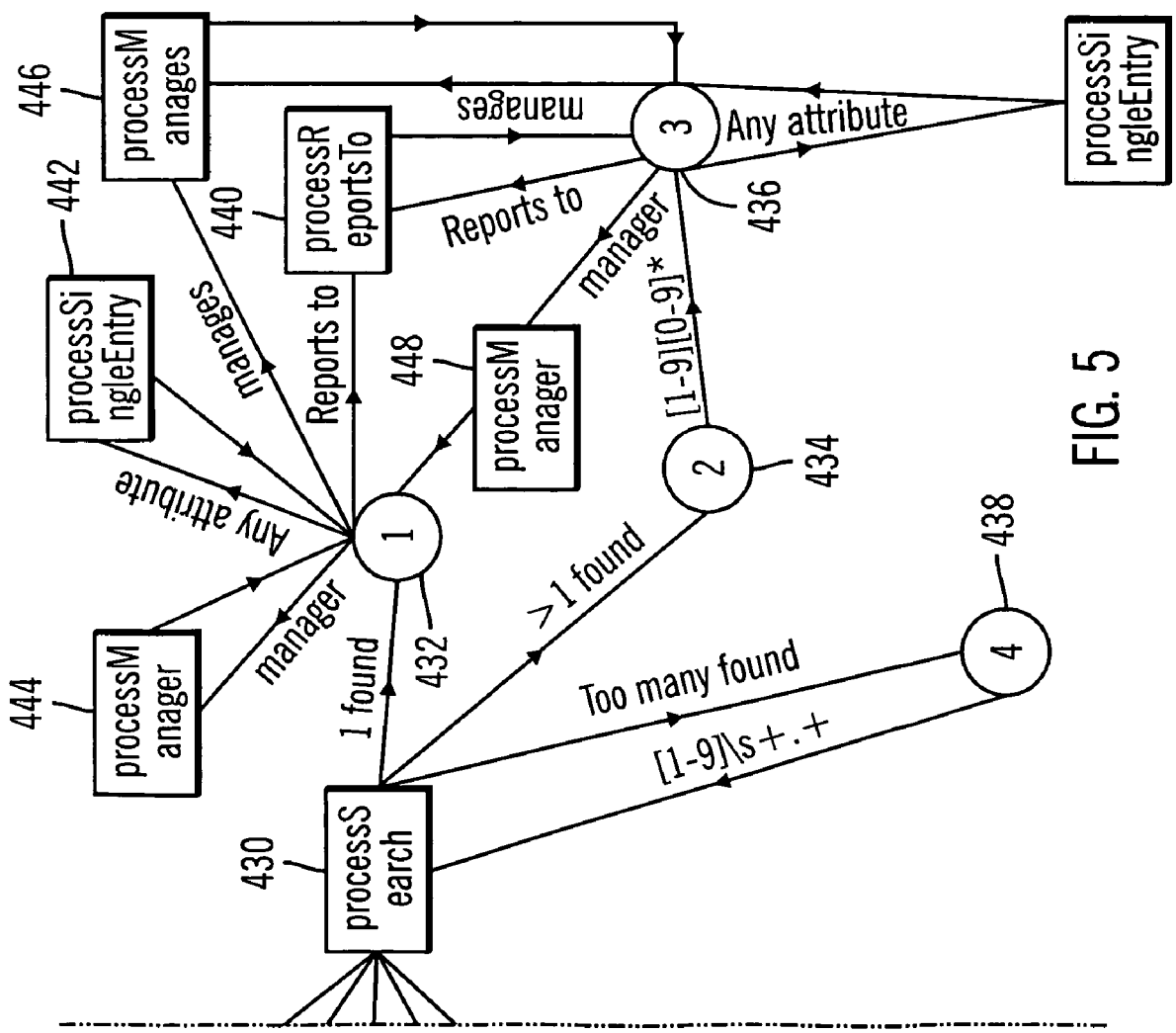

An exemplary Bot state transition definition diagram 400, according to an exemplary embodiment of the present invention, is illustrated in FIGS. 4 and 5. The exemplary Bot state transition diagram 400 follows conventional state transition nomenclature and indicators, as are known to ordinary practitioners in the relevant arts. The exemplary Bot state transition diagram 400 illustrates a Bot state transition diagram for a Bot that provides an employee information retrieval service. This exemplary Bot accepts runtime inputs that are requests for employee information. These requests are made by providing some information about the employee and a specification of the desired information. The Bot then returns the requested information.

The Exemplary Bot state transition diagram 400 illustrates five states, identified as states 0 through 4. State 0 402 is named as a "start" state. State 0 402 is illustrated as having five edges or available state transitions, a first transition 404, a second transition 406, a third transition 408, a fourth transition 410 and a fifth transition 412. Each of these transitions is shown to have a transition condition. Each of these transitions is also indicated to have a transition method. The first transition 404 has a first transition method 420, defined as a "processLastName" method. The second transition 406 has a second transition method 422, defined as a "processLastFirstName" method. The third transition 408 has a second transition method 424, defined as a "processLastName" method. The fourth transition 410 has a fourth transition method 426, defined as a "processTieLine" method. The fifth transition 412 has a fifth transition method 428, defined as a "processEmail" method. The transition method is executed when the condition for the associated transition is satisfied.

In addition to the transition method that is associated with each transition, all transitions are indicated to execute the processSearch method 430. After the processSearch method is executed, a state is entered dependent upon the number of results returned by that method. If too many results are found, the processing transits to state 4 438, which is a state named as a "question state". In the "question" state, the Bot waits for the user to provide further specification to narrow down the search. The further specification is provided as a name value pair. For example, the user can provide "country USA" to specify to only search for people who work in USA. If one result is found, the processing transits to state 1 432, named as a "person" state, where only one person is found by the Bot. If more than one person is found, the processing transits to state 2 434, the "list" state, where the list of found multiple people is sent to the client. If no results are found, the processing transits back to state 0 402.

When in state 2 434, if the client user selects a number from the returned list of people to indicate the person that is of interest. Upon receiving this number from the client, the state of this session for that Bot transfers to state 3 436, named the "Person & List" state. The legitimate runtime inputs from the client for state 3 436 are defined by a set of keywords specified by the Bot definition XML. We also call name keywords as attributes in the example used for this particular Bot instance, because each attribute corresponds to an attribute of the information of a person. An exemplary list of possible attributes 450 is displayed. This list is entered by the developer and corresponds to the data available in the system with which this particular Bot is interacting. For the current example of a search Bot, these attributes correspond to, for example, "name", "address", "email address", "job description", etc. The processing continues as is illustrated in this diagram.

Bot state transition diagrams are used to describe instant messaging Bot state machine definitions in the exemplary embodiment of the present invention. These state machines are defined in XML documents that conform to an XML schema that defines a BTDL. There are two XML schema— one for stateful Bot and another for stateless Bot. As described above, a Bot is able to be stateless or stateful. Each of these types of Bots has a separate XML schema defining a different BTDL. Each XML schema defines the grammar and structure of XML documents are required to follow. These XML documents define the state transfer diagram and legitimate input patterns of these various Bots.

An exemplary stateless Bot XML schema 500, as is used by an exemplary embodiment of the present invention, is illustrated in FIG. 6. This XML schema defines a BTDL for stateless Bots. The exemplary stateless Bot XML schema 500 includes a "statemachine" element definition 502. The statemachine element 502 defines the state machine element that controls the operation of a stateless Bot created by an exemplary embodiment of the present invention. The exemplary stateless Bot XML schema 500 further has a "state" element specification 504 that sets "maxOccurs" for that element to 1. This definition limits stateless Bot definitions that conform to this XML schema to only one state. The "statemachine" element further has a "stateful" attribute definition 530 that sets "stateful" to "N," indicating that this is a stateless Bot. The "statemachine" element further has a "handler" object class attribute definition 532 that defines a description of the handler object class that contains methods used by a Bot defined by an XML document that conforms to this schema in order to implement an instant messaging Bot. The developer in the exemplary embodiment provides the executable code for the class specified by the "handler" attribute. This class implements the methods specified in the "transfer" elements described below, which is to be loaded dynamically to the Bot hosting container at the time when the Bot is enabled at a computing system 300 in FIG. 3.

The exemplary stateless Bot XML schema 500 has a "state" element definition 508. The "state" element definition, along with its descendent definitions, defines the characteristics of state elements. The "state" element includes a "transfer" element specification 510 that specifies characteristics for each state transition for the state of a stateless Bot. The "maxOccurs" for the transfer element is specified as unbounded, thereby allowing any number of transitions to be defined. The "transfer" specification 510 includes a "helpmsg" attribute definition 520 that allows an optional help message to be defined for this transfer or transition.

The stateless Bot XML schema 500 has a "transfer" element definition 512 that further defines the transfer, or state transition processing, element for the single state of a stateless Bot definition that conforms to this XML schema. The transfer definition 512 includes a "match" attribute definition 514 that defines condition elements that are to be matched before implementing this transfer, i.e., this state transition. The "transfer" definition 512 further has a "method" attribute definition 516 that specifies a method to be executed when conditions for this transfer, as specified by "match" elements, are satisfied. Satisfying a state transition condition causes the associated method to be executed, which is the construction used by the stateless Bots of the exemplary embodiment to execute methods. The "transfer" definition 512 further has an "arguments" attribute definition 518 that defines optional arguments to be provided to the method defined by the "method" attribute definition 516.

An exemplary stateful Bot XML schema 600 is illustrated in FIG. 7. The stateful Bot XML schema defines a "statemachine" element definition 602 that has a structure similar to that of the stateless Bot XML schema 500. The "statemachine" element 602 of the stateful Bot XML schema 600 has a "state" element specification 604 that specifies "maxOccurs" to be "unbounded." This allows any number of states to be defined in an XML document that defines a stateful Bot that conforms to this schema. The "statemachine" element also has a "stateful" attribute definition 630 that sets "stateful" to "Y," indicating that this is a stateful Bot. The "statemachine" element further has a "handler" object class attribute definition 632 that defines the handler object class that contains methods that are used by a Bot defined by an XML document that conforms to this schema. The "statemachine" element further has a "Botstateclass" attribute definition 634 that identifies an object class that identifies the states of Bots. The developer provides the executable code for the class specified by the "Botstateclass" attribute. The "Botstateclass" is dynamically loaded into the Bot hosting container 338 at the time when the Bot is enabled at a computing system 300. At runtime, each Bot can host many communication sessions. To separate the communication sessions, the Bots create a unique instance of the class for each session. The instance of this class represents the state of the Bot in a given communication session. It contains the information that is stored as persistent across the states during the transition.

The exemplary stateful Bot XML schema 600 has a "state" element definition 608. The "state" element definition, along with its descendent definitions, defines the characteristics of each of the state elements defined in an XML documents that define stateful Bots that conform to this schema. The "state" element is defined to include a "transfer" element specification 610 that specifies each of the state transition characteristics for each state of a stateful Bot. The "maxOccurs" for the transfer element is specified as unbounded, thereby allowing any number of transitions to be defined. The "transfer" specification 610 includes a "helpmsg" attribute definition 620 that allows an optional help message to be defined for this transfer.

The stateful Bot XML schema 600 has a "transfer" definition 612 that defines each of the transfer, or state transition processing, XML document elements that are used for each state of a stateful Bot definition that conforms to this XML schema. The transfer definition 612 includes a "match" attribute definition 614 that specifies the format of conditions that are to be matched before implementing this transfer, i.e., this state transition. The "transfer" definition 612 further has a "method" attribute definition 616 that specifies a method to be executed when conditions for this transfer, as specified by "match" elements, are satisfied. Satisfying a state transition condition causes the associated method to be executed in the exemplary embodiment. The "transfer" definition 612 further has an "arguments" attribute definition 618 that defines optional arguments to be provided to the method defined by the "method" attribute definition 616.

The "transfer" element for stateful Bots further includes an optional "timeout" attribute definition 626 that is used to define a timeout period for a transition. Timeout attributes are used for real-time and long-standing Bots as described herein. Transfer elements defined by this exemplary schema also have an optional "event" attribute definition 624 that specifies an event that will cause that transfer to be executed. Transfer elements defined by this exemplary schema also have an optional "state" attribute definition 622 that specifies the state to which the stateful Bot is to transition after execution of this transfer.

Figure 8:
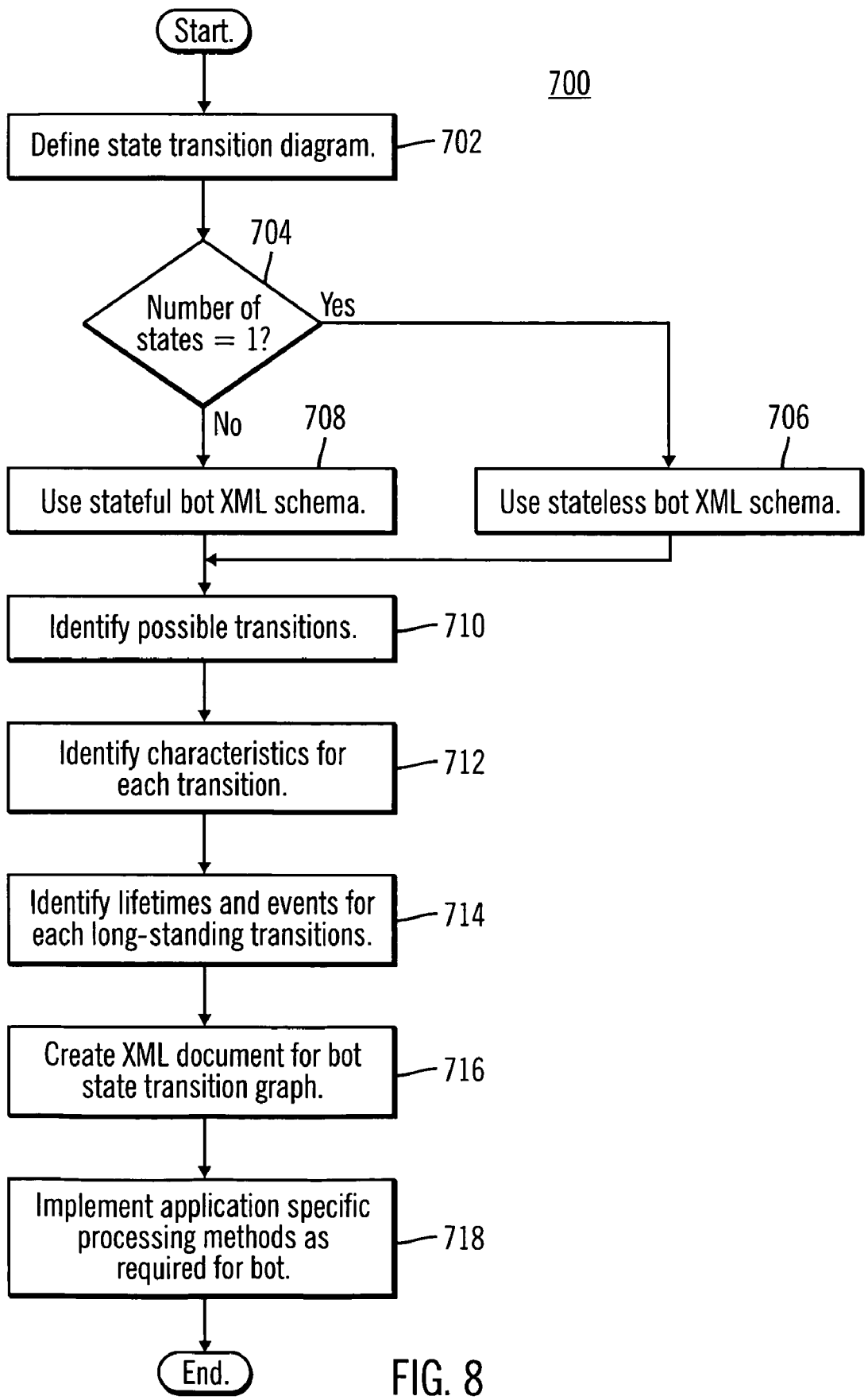
FIG. 8 illustrates an exemplary Bot creation processing flow diagram, as executed by exemplary embodiments of the present invention.

An exemplary Bot creation processing flow diagram 700, as executed by exemplary embodiments of the present invention, is illustrated in FIG. 8. This exemplary Bot creation processing flow is performed in the exemplary embodiment via use of a Bot development system that includes a Graphical User Interface (GUI). This GUI is used to facilitate a developer's entry of a Bot state transition diagram and formats for runtime inputs to be received by the Bot. The creation of a Bot begins by identifying, at step 702, the state transition diagram for the Bot being developed. The exemplary embodiment of the present invention includes a Graphical state transition diagram editor that facilitates entry, revision and testing of the state transition diagrams that are defined for the Bots being created by the exemplary embodiments. The exemplary embodiment further includes facilities for entering acceptable formats for runtime inputs of a state of the state transition diagram to be received by the executing instant messaging Bot. These facilities optionally include a format checker that automatically validates the format for runtime inputs that are supplied by a Bot developer. The GUI of the exemplary embodiment further displays a list of examples for acceptable input formats for runtime inputs in order to further assist the Bot developer.

The processing next determines, at step 704, the number of states defined for the Bot's state transition diagram. If it is determined that there is only one state for this Bot, state information does not have to be maintained between messages and a stateless Bot machine is selected, at step 706, for this application. If it is determined that there are more that one states, a stateful Bot is selected, at step 708.

The design processing continues by identifying, at step 710, the possible transitions and transition conditions for each state. Transition characteristics for each transition are then identified, at step 712. Transition characteristics in the exemplary embodiment include, for example, a runtime input pattern, process method, and whether the transition is real-time or long-standing. In the case of a long-standing transition, the designer then identifies, at step 714, the lifetime of the transition and the transition event.

After the definition of the state transition diagram for this Bot, the processing then creates, at step 716, an XML document that defines this transition graph. This XML document is based upon the schema selected above. The designer then implements, at step 718, the application-specific processing methods that are defined by the transition graph.

After a Bot is developed, the Bot definition document in XML and the code developed for the application specific processing methods are deployed in the Bot hosting container 338.

Portions of an exemplary XML document 800, as is generated by an exemplary embodiment of the present invention, are illustrated in FIGS. 9 through 12. The exemplary XML document 800 corresponds to the exemplary Bot state transition diagram 400 and conforms to the stateful Bot schema 600.

In order to further facilitate the development of Bots by the exemplary Bot development system, the Bot development system defines a Bot Transition Definition Language (BTDL). BTDL is a language and notation set that is used to define state transition graph for Bots to be created and deployed. The BTDL of the exemplary embodiment uses an XML syntax to specify development, creation and processing of application-specific state transition graphs. An XML schema is used at a structural level to define the syntax of acceptable XML documents. A BTDL defines the structure and behavior of a Bot, including all states, outbound edges of each state, regular expressions for each edge (regular expression specify the legitimate inputs for this edge), and a processing method for each edge. A lifetime of each transition for an edge also can be defined in the exemplary embodiment. Transition lifetimes are discussed in detail herein.

As with various other communication scenarios, communications supported by the Bots of the exemplary embodiment are able to be either real-time communications or long-standing communications. Real-time communications in this context refers to cases where the end-user expects message exchanges with Bots to be relatively quick. For example, in the case of searching for an employee phone number from a Bot, the Bot is expected to return the search results without much delay and is classified as a real-time Bot. In another example, in the case of asking a technical question to a help Bot, a user might allow the help Bot to take some time to find the answer. Depending upon the application, such a help Bot can take hours or even days to return the results. Such a Bot is therefore characterized as a long-standing Bot.

Advantages of long-standing Bot operations are that long-standing Bots can be used for asynchronous business transactions. Long-standing Bots further enable Both proactive or reactive Bot state machines wherein either the Bot or the client initiates communication. Long-standing Bots also enable a transaction session to cross multiple online sessions with a particular user.

Long-standing Bots are created with the aid of the exemplary Bot development system of the exemplary embodiment. The design of long-standing Bots includes several features. The state transition diagrams that define various Bots specify whether a transition is real-time or long-standing. If a Bot is long-standing, one or more transition conditions are defined to include an execution time out event or an alert notice event. Long standing Bots further serialize long-standing communication sessions into persistent storage that is retained when physical communications is terminated between the Bot and another client. The serialization is implemented, for example, as Enterprise JavaBeans (EJB), in a file system or in a RDBMS database. Long-standing Bots further include facilities for waking up the communication session if the transition, e.g., action, is finished and all the clients for the communication sessions are online again.

The exemplary embodiment of the present invention includes a runtime environment in which Bots defined by XML documents that conform to a BTDL execute. The runtime environment of the exemplary embodiment includes processing components that implement the Bots that are defined in one or more XML documents. The runtime environment is also able to optionally display a help message upon satisfaction of a corresponding help condition. A corresponding help condition is a condition that is associated with an intrinsic transition that specifies display of a help message. The runtime environment of the exemplary embodiment further maintains data associated with communications sessions for the implemented Bots and processes long-standing Bots by continuing to implement the Bot, by executing the function or methods for that Bot, after a physical communication session associated with the Bot terminates.

A Bot cleaner is included in the operation of the exemplary embodiment. A particular Bot in the exemplary embodiment is able to simultaneously keep track of multiple active sessions. There may be no explicit event in the exemplary embodiment to indicate that communications are finished in a case where the user does not explicitly close the communications session. The lack of such an event would limit the scalability of the system. A Bot cleaner is included in the exemplary embodiment to address this scenario.

A Bot cleaner of the exemplary embodiment is a continuously executing programmable thread. The Bot cleaner of the exemplary embodiment runs independently and in the same process as the Bot. There is only one Bot cleaner in the exemplary embodiment for each computer processing node executing Bots and the Bot cleaner can be enabled or disabled at will.

The Bot cleaner is periodically executed as a default. The period of Bot cleaner execution time interval is determined by the nature of the application and computing performance considerations. Typically, a Bot cleaner purges sessions that are not active for a certain amount of time. This inactive time is measured as the time since a client last communicated with the Bot. In applications where a communications session is required to be maintained beyond a physical communication session of messaging system; the cleaner is configured to combine observation and the definition of an inactive time threshold with the state of the session. Such a combination can result in a different inactive time thresholds to be required prior to purging of a Bot based upon state of the communications session.

The advantages of the methodology provided by the exemplary embodiment include externalizing the logic of state transitions into an XML document and also externalizing the runtime input pattern matching to the XML document. This externalization facilitates adding and changing the runtime inputs accepted by the Bot without re-programming. The advantages further include separating specification of back-end computation from the definitions of state transitions that are to be made in response to the user runtime input. The Bots created by the exemplary embodiments allow easy addition of new functions and support for context based help messages. The exemplary embodiment further relieves the Bot creator of having to store data within the code of the Bot to maintain the state of the Bot during execution and to clean up processing upon termination of the Bot. The exemplary embodiments of the present invention further provide an extensible framework that is applicable and adaptable for stateless, stateful and long-standing Bots.

Non-limiting Software and Hardware Examples

Embodiments of the present invention can be implemented as a program product for use with a computer system such as the computing node shown in FIG. 3 and described herein. The program(s) of the program product defines functions of the embodiments (including the methods described herein) and can be contained on a variety of signal-bearing medium. Illustrative signal-bearing medium include, but are not limited to: (i) information permanently stored on non-writable storage medium (e.g., read-only memory devices within a computer such as CD-ROM disk readable by a CD-ROM drive); (ii) alterable information stored on writable storage medium (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It is also clear that given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.) It should be appreciated that the invention is not limited to the specific organization and allocation or program functionality described herein.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

Each computer system may include, inter alia, one or more computers and at least a signal bearing medium allowing a computer to read data, instructions, messages or message packets, and other signal bearing information from the signal bearing medium. The signal bearing medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the signal bearing medium may comprise signal bearing information in a transitory state medium such as a network link and/or a network interface, including a wired network or a wireless network, that allow a computer to read such signal bearing information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A method for defining an instant messaging Bot process, the method comprising:

accepting at least one XML schema that defines elements of a Bot transition definition language to be used in specifying instant messaging Bots, the elements of the Bot transition definition language adapted for use in XML documents that define instant messaging Bots that accept at least one natural language text runtime input created by human users and provide at least one response in response to the at least one natural language text runtime input, wherein the Bot transition definition language comprises definitions for elements that correspond to:
at least one state definition,
at least one state transition definition, and
at least one condition definition for each of the at least one state transition, the at least one condition definition defining a condition based upon a respective received natural language text runtime input;

creating a state transition definition diagram for an instant messaging Bot, the state transition definition diagram comprising at least one state, at least one state transition, and at least one condition that is based upon a respective received natural language text runtime input received from a respective human user for each of the at least one state transition; and generating an XML document that abides to the at least one XML schema and comprises elements of the Bot transition definition language, the XML document defining the state transition definition diagram.

2. The method according to claim 1, wherein the Bot transition definition language comprises at least one state transition definition that supports specifying legitimate natural language text runtime input formats and the XML document defines a set of legitimate natural language text runtime input formats in accordance with the Bot transition definition language.

3. The method according to claim 1, wherein the instant messaging Bot is able to participate with a plurality of clients in a plurality of instant messaging sessions.

4. The method according to claim 1, wherein the creating the state transition definition diagram comprises defining at least a portion of the state transition definition diagram with a graphical user interface, and wherein the Bot transition definition language comprises at least one state transition definition that supports specifying legitimate natural language text runtime input formats, the method further comprising:
entering, into the graphical user interface, a respective format for at least one natural language text runtime input that corresponds to at least one of the at least one condition, the respective format complying with the Bot transition definition language; and
validating the format.

5. The method according to claim 1, wherein the XML schema further specifies that the Bot transition definition language has an attribute definition that defines a description of a handler object class comprising software methods used by the instant messaging Bots, and the method further comprises submitting the XML document to a runtime environment that processes the XML document in order to implement the instant messaging Bot and the runtime environment further executes software methods within the at least one object class in conjunction with the instant messaging Bot defined by the XML document.

6. The method according to claim 5, wherein the state transition definition diagram comprises at least one help message that is to be displayed in response to satisfaction of a corresponding help condition, and wherein the runtime environment displays the help message upon satisfaction of the help condition.

7. The method according to claim 5, wherein the runtime environment implements the instant messaging Bot within physical communications sessions, and wherein the Bot transition definition language comprises elements that define the at least one state transition definition to include a timeout value, wherein the runtime environment continues to implement, in response to the XML document defining a at least one state transition with a timeout value, the instant messaging Bot after a physical communication session associated with the instant messaging Bot terminates.

8. The method of claim 1, wherein the at least one XML schema comprises a stateless XML schema and a stateful XML schema, the stateless XML schema defining a Bot transition definition language that defines the instant messaging Bots to have only one state, and the stateful XML schema defining a Bot transition definition language that defines the instant messaging bots to have a plurality of states.

9. An instant messaging Bot development system, comprising:

an XML schema repository for storing at least one XML schema, each of the at least one XML schema defining elements of a Bot transition definition language to be used in specifying instant messaging Bots, the elements of the Bot transition definition language adapted for use in XML documents that define instant messaging Bots that accept at least one natural language text runtime input created by human users and provide at least one response in response to the at least one natural language text runtime input, wherein the Bot transition definition language comprises definitions for elements that correspond to:
at least one state definition,
at least one state transition definition, and
at least one condition definition for each of the at least one state transition, the at least one condition definition defining a condition based upon a respective received natural language text runtime input;

creating a state transition definition diagram for an instant messaging Bot, the state transition definition diagram comprising at least one state, at least one state transition, and at least one condition that is based upon a respective received natural language text runtime input received from a respective human user for each of the at least one state transition;

a state transition definition diagram definition tool for creating a state transition definition diagram for an instant messaging Bot, the state transition definition diagram comprising at least one state, at least one state transition, and at least one condition that is based upon a respective received natural language text runtime input received from a respective human user for each of the at least one state transition; and an XML document generator for generating an XML document that abides to the at least one XML schema and comprises elements of the Bot transition definition language, the XML document defining the state transition definition diagram.

10. The instant messaging Bot development system according to claim 9, wherein the Bot transition definition language comprises at least one state transition definition that supports specifying legitimate natural language text runtime input formats, and wherein the state transition definition diagram definition tool further accepts a set of legitimate natural language text runtime input formats, and the XML document defines the set of legitimate natural language text runtime input formats in accordance with the Bot transition definition language.

11. The instant messaging Bot development system according to claim 9, wherein the instant messaging Bot is able to participate with a plurality of clients in a plurality of instant messaging sessions.

12. The instant messaging Bot development system according to claim 9, wherein the state transition definition diagram definition tool comprises a graphical user interface for defining at least a portion of the state transition definition diagram.

13. The instant messaging Bot development system according to claim 12, wherein the graphical user interface further supports entry of a respective format for at least one natural language text runtime input that corresponds to at least one of the at least one condition, the respective format complying with the Bot transition definition language, and wherein the instant messaging Bot development system further comprises a format checker for validating the format.

14. The instant messaging Bot development system according to claim 9, wherein the XML schema further specifies that the Bot transition definition language has an attribute definition that defines a description of a handler object class comprising software methods used by the instant messaging Bots, and the instant messaging Bot development system further comprises a runtime environment that processes the XML document in order to implement the instant messaging Bot and the runtime environment further executes software methods within the at least one object class in conjunction with the instant messaging Bot defined by the XML document.

15. The instant messaging Bot development system according to claim 14, wherein the state transition definition diagram comprises at least one help message that is to be displayed in response to satisfaction of a corresponding help condition, and wherein the runtime environment displays the help message upon satisfaction of the help condition.

16. The instant messaging Bot development system according to claim 15, wherein the runtime environment implements the instant messaging Bot within physical communications sessions, and wherein the Bot transition definition language comprises elements that define the at least one state transition definition to include a timeout value, wherein the runtime environment continues to implement, in response to the XML document defining a at least one state transition with a timeout value, the instant messaging Bot after a physical communication session associated with the instant messaging Bot terminates.

17. A processor configured to execute an instant messaging Bot runtime system, comprising:
a runtime environment for processing an XML document in order to implement an instant messaging Bot in conjunction with at least one object class, wherein the XML document conforms to an XML schema that defines a Bot Transition Definition Language for use in developing instant messaging Bots, the elements of the Bot transition definition language adapted for use in the XML document defining instant messaging Bots that accept at least one natural language text runtime input created by human users and provide at least one response in response to the at least one natural language text runtime input, wherein the Bot transition definition language comprises definitions for elements that correspond to:
at least one state element; and
at least one state transition element,
wherein at least one of the at least one state transition element comprises at least one condition for the at least one of the at least one state transition, the at least one condition definition defining a condition based upon a respective received natural language text runtime input.

18. A computer program product for defining an instant messaging Bot process, the computer program product comprising:
a storage medium readable by a processing circuit and storing by being tangibly encoded with instructions for execution by the processing circuit for performing a method comprising:
accepting at least one XML schema that defines elements of a Bot transition definition language to be used in specifying instant messaging Bots, the elements of the Bot transition definition language adapted for use in XML documents that define instant messaging Bots that accept at least one natural language text runtime input created by human users and provide at least one response in response to the at least one natural language text runtime input, wherein the Bot transition definition language comprises definitions for elements that correspond to:
at least one state definition, at least one state transition definition, and
at least one condition definition for each of the at least one state transition, the at least one condition definition defining a condition based upon a respective received natural language text runtime input;
creating a state transition definition diagram for an instant messaging Bot, the state transition definition diagram comprising at least one state, at least one state transition, and at least one condition that is based upon a respective received natural language text runtime input received from a respective human user for each of the at least one state transition; and
generating an XML document that abides to the at least one XML schema and comprises elements of the Bot transition definition language, the XML document defining the state transition definition diagram.

19. The computer program product according to claim 18, wherein the Bot transition definition language comprises at least one state transition definition that supports specifying legitimate natural language text runtime input formats and the XML document defines a set of legitimate natural language text runtime input formats in accordance with the Bot transition definition language.

20. The computer program product according to claim 18, wherein the instant messaging Bot is able to participate with a plurality of clients in a plurality of instant messaging sessions.

21. The computer program product according to claim 18, wherein the instructions for creating the state transition diagram comprise instructions for defining at least a portion of the state transition definition diagram with a graphical user interface.

22. The computer program product according to claim 21, further comprising instructions for:
entering, into the graphical user interface, a respective format for at least one natural language text runtime input that corresponds to at least one of the at least one condition, the respective format complying with the Bot transition definition language; and
validating the legitimate format.

23. The computer program product according to claim 18, wherein the XML schema further specifies that the Bot transition definition language has an attribute definition that defines a description of a handler object class comprising software methods used by the instant messaging Bots, the computer program product further comprising instructions for submitting the XML document to a runtime environment that performs functions of the instant messaging Bot and the runtime environment further executes software methods within the at least one object class in conjunction with the instant messaging Bot defined by the XML document.

24. The computer program product according to claim 23, wherein the state transition definition diagram comprises at least one help message that is to be displayed in response to satisfaction of a corresponding help condition, and wherein the runtime environment displays the help message upon satisfaction of the help condition.

25. The computer program product according to claim 23, wherein the runtime environment performs the functions of the instant messaging Bot within physical communications sessions, and wherein the Bot transition definition language comprises elements that define the at least one state transition definition to include a timeout value, wherein the runtime environment continues to perform, in response to the XML document defining a at least one state transition with a timeout value, the functions after a physical communication session associated with the instant messaging Bot terminates.

26. A method for defining an instant messaging Bot process, the method comprising:
accepting at least one XML schema that defines elements of a Bot transition definition language to be used in specifying instant messaging Bots, the elements of the Bot transition definition language adapted for use in XML documents that define instant messaging Bots that accept at least one natural language text runtime input created by human users and provide at least one response in response to the at least one natural language text runtime input,
wherein the Bot transition definition language comprises definitions for elements that correspond to:
a state machine specification comprising:
a specification that the state machine is one of stateful and stateless,
a specification of a handler class able to indicate a software object class comprising software methods used by the instant messaging Bot,
a specification of a Bot state class able to indicate an object class that identifies the states of the Bot, and
at least one state definition, and
at least one state transition definition, the at least one state transition definition comprising:
at least one condition definition for each of the at least one state transition, the at least one condition definition defining a condition based upon a respective received natural language text runtime input that is to be satisfied prior to implementing the at least one state transition,
a method attribute definition able to specify a software method to be executed upon satisfaction of the condition,
an arguments attribute definition able to define arguments to be provided to the software method to be executed upon satisfaction of the condition,
a timeout attribute definition able to specify a timeout period for the at least one state transition,
an event attribute definition that is able to specify an event that will cause the at least one state transition to execute, and
a state attribute definition that is able to specify a final state to which the at least one state transition definition will end upon execution;
creating a state transition definition diagram for an instant messaging Bot, the state transition definition diagram comprising at least one state, at least one state transition, and at least one condition that is based upon a respective received natural language text runtime input received from a respective human user for each of the at least one state transition; and
generating an XML document that abides to the at least one XML schema and comprises elements of the Bot transition definition language, the XML document defining the state transition definition diagram.

* * * * *